United States Patent [19]

Pedersen et al.

[11] 4,251,758

[45] Feb. 17, 1981

[54] CONTROL CIRCUIT FOR A SELF-STARTING ELECTRIC MOTOR

[75] Inventors: Hans-Kristian Pedersen, Nordborg; Frode Sorensen, Sonderborg; Jorgen Hyldal, Nordborg, all of Denmark

[73] Assignee: Danfoss A/S, Nordborg, Denmark

[21] Appl. No.: 12,339

[22] Filed: Feb. 15, 1979

[51] Int. Cl.³ .................................................. H02P 6/02
[52] U.S. Cl. ...................................... 318/254; 318/138; 318/439
[58] Field of Search .................... 318/138, 254, 254 A, 318/439

[56] References Cited

U.S. PATENT DOCUMENTS

| | | | |
|---|---|---|---|
| 4,065,706 | 12/1977 | Gosling et al. | 318/138 |
| 4,097,788 | 6/1978 | Nygaard et al. | 318/138 |

Primary Examiner—J. V. Truhe
Assistant Examiner—John W. Redman
Attorney, Agent, or Firm—Wayne B. Easton

[57] ABSTRACT

The invention relates to a self-starting electric motor assembly of the type having a permanent magnet rotor, a stator with two windings and electronic switching elements for the windings controlled by switching signals occurring in push-pull and derived from control signals of a sensor detecting the angular position of the rotor. At standstill and for normal running operation the magnetic field distributions between the stator and rotor are selected in a known manner, so that the rotor assumes an angular position which is displaced in relation to the neutral position as an aid to starting and so that the switchover occurs at an angular position ahead of the neutral position to provide greater efficiency for the running operation. A modulating circuit is provided which causes the rotor to be "wound-up" in the reverse direction during starting so that the rotor will gain a substantial starting momentum in the driving direction upon termination of the wind-up and the initiation of the normal running control signals.

5 Claims, 9 Drawing Figures

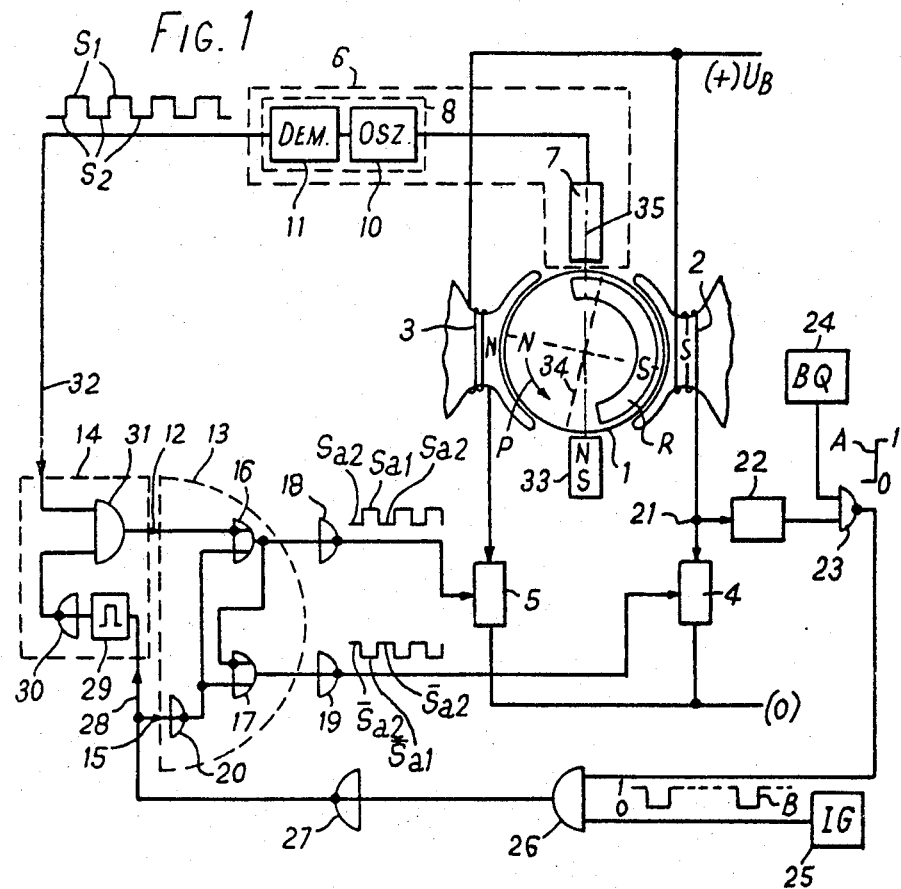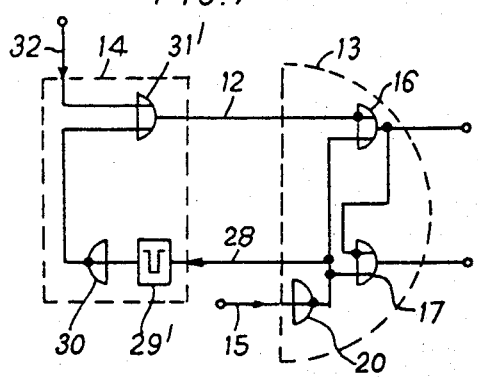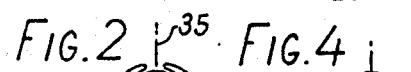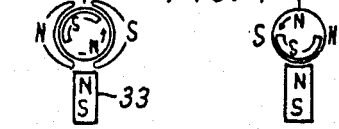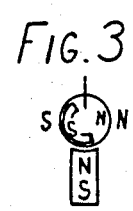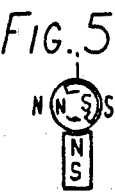

CONTROL CIRCUIT FOR A SELF-STARTING ELECTRIC MOTOR

The invention relates to a control circuit for a self-starting electric motor comprising a permanent magnet rotor, a stator with two windings, and, applied in series therewith to a DC operating voltage, electronic switching elements of which the switching conditions are so controllable by switching signals occurring in push-pull and derived from control signals of a sensor detecting the angular position of the rotor even on standstill, that the stator field changes direction in response to the angular position of the rotor, and comprising a magnetic field distribution between the stator and rotor selected so that the rotor can assume an angular position as the rest position which is at most displaced in relation to the neutral position (the neutral angular position).

In a known control of this kind, the rotor can assume numerous rest positions. However, it strives to assume an extreme rest position in which a rotor magnet is surrounded at the furthest distance by a stator pole shoe. With symmetrically constructed stator poles, the resulting torque of the rotor is zero in these positions when the stator is magnetised.

When the rotor is disposed in a neutral position, its neutral axis coincides with the neutral axis of the stator. An unsymmetric magnetic field distribution between the rotor and stator, e.g. an additional permanent magnet on the stator, ensures that the rest position does not coincide with the netural position but is displaced with respect thereto by no more than an acute angle (about 5°). This achieves a defined starting direction.

In such a motor, the stator field must have its poles changed after every half revolution of the rotor. However, by reason of the self-inductance of the stator winding, this pole changing does not occur as rapidly as does the switching-over of the switching elements. Thus, if the switching-over point of the switching elements is selected so that switching over occurs exactly at that instant at which the rotor passes a neutral rotary position, then changing of the poles of the stator field is concluded only after the rotor has already passed through this neutral rotary position, so that, from the instant at which it passes through this neutral rotary position up to the time of the final pole change of the stator field, it receives a counter-torque which exerts a braking action. This results in a poor efficiency.

The invention is therefore based on the problem of providing a control circuit at which the motor achives a better efficiency and which also ensures that the motor can start in any rotary position.

According to the invention, this problem is solved in that (a) the normal switch-over point of the switching elements is disposed just in front of each neutral position of the rotor and (b) a modulating circuit is provided which, in a rest position of the rotor corresponding to an angular position obtaining after passing the switch-over point in the desired direction and in front of the subsequent neutral position of the rotor, holds conductive during a modulating period the switching element which is conductive in this angular position, irrespective of the control signal produced by the sensor during this period.

This feature ensures that pole changing of the stator field already occurs before reaching a neutral rotary position and, upon reaching this position, pole changing is already concluded at least for the greater part. The stator field therefore acts practically simultaneously with reaching the neutral angular position in the desired direction of rotation, without exerting a marked counter-torque before reaching the neutral angular position. This results in a more uniform torque during operation.

However, because of the lead angle at which the normal switch-over point is disposed in front of the neutral position, difficulties would arise if, on switching off, the rotor were to stop in one of the extreme angular positions just in front of the neutral position after passing the normal switch-over point. When the motor is switched on in such an angular position, the stator field turns the rotor backwards. Shortly thereafter, the normal switch-over point is passed in the reverse direction. The stator field now changing its poles would brake the rotor and drive it in the desired direction of rotation. This would cause the switch-over point to be immediately passed again. Since the rotary speed of the rotor would not yet be so high that its inertia suffices to continue to turn it in the desired direction beyond the neutral angular position despite the renewed pole changing of the stator, the counter-torque of the unsymmetric magnetic field distribution (of the additional permanent magnet) and the load, the rotor would immediately again turn opposite to the desired direction, i.e. backwards. The result would be that the rotor turns back and forth about the angular position at which pole changing of the stator field takes place. Such pendulating oscillations are avoided by feature (b).

If the rotor stops in the stated extreme position, the modulating circuit is effective so that, although the rotor starts opposite to the desired direction of rotation, it passes the normal switch-over point, which is suppressed. The rotor can turn backwards for as far as it can reach during the modulating period, which depends, inter alia, on the load. After the modulating period, the stator field has its poles changed corresponding to the instantaneous angular position of the rotor, the rotor is braked and starts in the desired direction. Since the rotor must now run through a larger angle in the forward direction until it again reaches the normal switch-over point, it has a sufficient rotary speed imparted to it so as to overcome the counter-torque and pass the neutral position at which the stator field with the instantaneous poling continues to act in the desired direction of rotation. The rotor is therefore first driven backwads out of the critical extreme angular position of standstill through an angle larger than the lead angle and thereafter turned in the desired direction without executing pendulating oscillations.

In a preferred example, each starting of the motor is initiated with a modulating period from the instant of switching on, and the switching condition of the switching elements is necessarily set corresponding to the control signals in a critical extreme rest position.

In this way one avoids the complicated adaptation of initiation of the modulating circuit to a particular starting position. The rotor first turns backwards, even from several starting positions out of which it would otherwise immediately turn in the desired direction; however, this enables one to achieve a very simple circuit.

In a first angular starting range beyond the critical extreme position, the rotor immediately turns in the prescribed direction, namely through the larger part of the angular range in which the switching condition of the switching elements necessarily set by the modulating circuit coincides with that demanded by the sensor.

In a different angular range in which there is no coincidence with the switching condition demanded by the sensor during the modulating period, the rotor first turns backwards.

It is desirable if a single of predetermined duration is produced in the modulating circuit that serves instead of the control signal to discharge the switching signals during starting. This permits a simple construction for the modulating circuit.

The electronic switching elements can be supplied with the switching signals by way of a gate circuit which is gated in response to the normal running signal and, at the instant of starting as well as when the rotor is blocked, alternately receives from a pulse generator, which is independent of the normal running signal generator, comparatively short starting signals as gating signals and longer stop signals as blocking signals which are modulated by the normal running signal during normal operation. In this case the first attempt at starting takes place when the motor is switched on as soon as the first starting signal is supplied by the pulse generator. If the motor fails to start, the supply of switching signals to the electronic switching elements is blocked by the gate circuit during the time of the following stop signal of the pulse generator. Only on occurrence of the following start signal will another starting attempt take place. Once the motor is running, operation is continued by reason of the modulation (over-control) by the normal running signal. If the rotor is blocked during operation, the normal running signal will disappear and the motor is switched off by a stop signal from the pulse generator. Thereafter, starting is again attempted automatically upon arrival of the next starting signal. The starting attempts occur only momentarily after prolonged pauses so that the respective stator winding or the respective switching element is not overloaded. If blocking disappears by itself, the motor will restart automatically. The normal running signal generator in this case modulates the signals of the independent pulse generator as soon as the motor runs normally.

The control signals of the sensor can simply be supplied to the gate circuit by way of one input of the modulating circuit.

Further, the gating input of the gate circuit may be connected to the gating input of the modulating circuit, both inputs being supplied with the starting, stop and normal running signals. The modulating circuit will respond only to the first signal occurring at its gating input, thereby making the circuit particularly simple.

If the modulating circuit responds to the front flank of a running signal, one ensures that on switching on the motor a starting signal initiates the modulating period and the duration of the modulating signal is independent of the duration of other signals.

If the control signals are rendered inoperative and the gate circuit is shifted to a predetermined switching condition upon response of the modulating circuit, the desired modulation of the switching signals can be achieved particularly easily.

The duration of the modulating period of the modulating circuit should in this case be shorter than one starting signal. In this way one ensures that immediately after the end of the modulating period the correct starting conditions will again obtain in order to drive the rotor in the prescribed direction of rotation.

The modulating circuit may comprise a time element and a link element which is acted on thereby, blocks the control signal of the sensor in response to the output signal of the time element and switches over the gate circuit and releases both of them again after the modulating period. This results in a particularly simple construction for the modulating circuit.

Further, the time element may be operable in response to the signal supplied to the gating input of the gate circuit and the modulating circuit may act on the modulating input of the gate circuit. This results in particularly simple synchronisation between actuation of the time element and starting of the motor by a starting signal.

Further, provision may be made for the time element to contain a differentiating RC element and for a switching stage to be disposed between the link element and the time element. In this case the switching stage is switched over precisely by the front flank of an actuating pulse, whilst the duration of the new switching condition of the switching stage does not depend on the disappearance of the actuating pulse but merely on the running time of the time element. The duration of the starting signal or a normal running signal overlapping same will therefore not influence the modulating period.

Preferred examples of the invention will now be described in more detail with reference to the drawing, wherein:

FIG. 1 is a block circuit diagram of a control circuit constructed according to the invention;

FIGS. 2 to 6 show different rest positions for the rotor with associated stator field polarity without a modulating circuit;

FIG. 7 shows a modification of part of the FIG. 1 control circuit;

Figure 8:
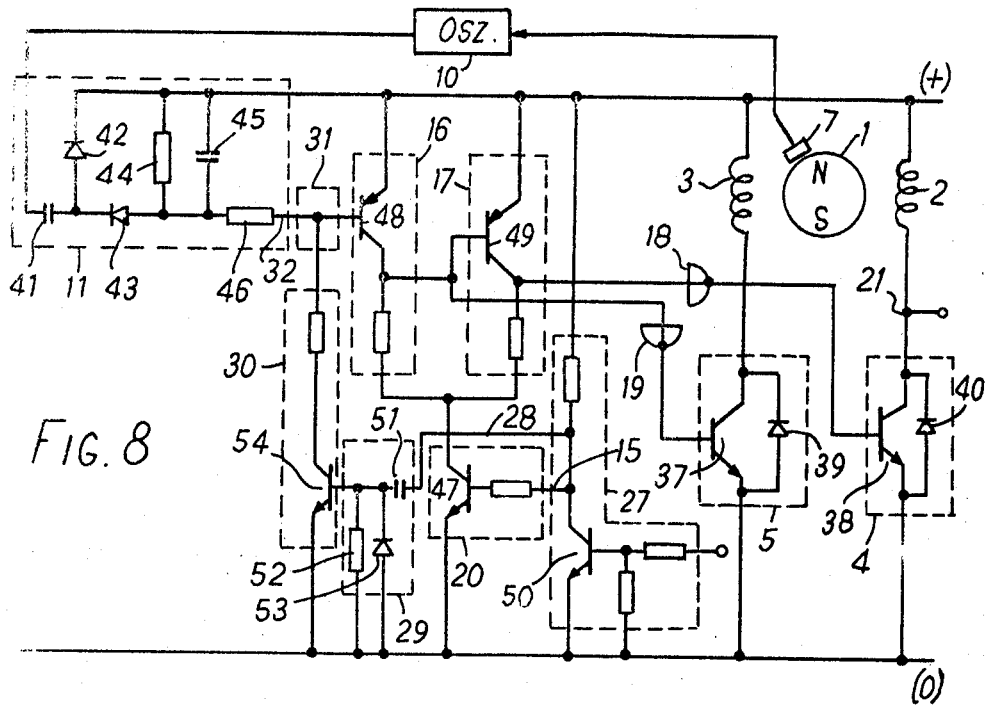
FIG. 8 is a more detailed circuit diagram of part of the FIG. 1 control circuit.

FIG. 1 shows a control circuit for a DC motor without brushes, comprising a two-pole permanent magnet rotor 1 and two stator windings 2 and 3 applied to a DC operating voltage $U_B$ respectively in series with an electronic switching element 4 or 5. The switching elements 4 and 5 are operated by 1-signals and blocked by 0-signals. Transforming means 6 contain a sensor 7 for detecting the angular position of the rotor 1 and a pulse former 8 downstream of the sensor 7. The sensor 7 which is preferably a coil with a saturated core responds, by reason of a change in its (inductive) resistance to the passing of a substantially semicircular annular disc R of metal, preferably magnetisable metal, secured to the rotor 1 and delivers a signal of which the value is that of the other of two values after each half rotation of the rotor. This signal is converted by the pulse former 8 into a sequence of control signals $S_1$, $S_2$ of which the gating ratio (pulse duration/duration of period) is 1:2. For this purpose, the pulse former 8 contains an oscillator 10 which can be switched on and off by the signal of the sensor and has a demodulator 11 downstream of it. The control signals $S_1$, $S_2$ are fed to the transmission input 12 of a gate circuit 13 by way of a modulating circuit 14. The other input 15 of the gate circuit 13 serves as a gating input. The gate circuit 13 contains two link elements 16 and 17 in the form of OR elements each with a reversing stage in the transmission input. The gating inputs of the link elements 16 and 17 are interconnected. Further, the output of the link element 16 is connected to the transmission input of the link element 17. The outputs of the link elements 16 and 17 also form the outputs of the gate circuit 13 and are connected by a respective NOT element 18 or 19 in the form of reversing amplifiers to the control inputs of the switching elements 5 or 4. A common NOT element 20 is also disposed between the gating input 15 and the gating inputs of the link elements 16, 17. This element 20 forms a NAND element together with each downstream link element 16 or 17, respectively.

The junction 21 between the stator winding 2 and the switching element 4 is connected by way of a pulse sequence frequency measuring element 22 to the one input of a comparator 23 which has the function of a NAND element. At the other input of the comparator 23 there is a reference voltage source 24. The output signal A of the comparator 23 is linked to the output signal B of a pulse generator 25 by an AND element 26. The output signal of the AND element 26 is fed to the gating input 15 of the gate circuit 13 and the gating input 28 of the modulating circuit 14 by way of a NOT element 27. At the input 28, the modulating circuit 14 contains a time element 29 and downstream thereof a switching stage in the form of a NOT element 30 which acts on the gating input of a link element 31 acting as a gate, in this case an AND element, of which the transmission input forms the transmission input 32 of the modulating circuit 14.

A permanent magnet 33 is so applied to the stator that, with the stator windings 2 and 3 de-energised, the rotor 1 will normally assume a position in which the neutral axis 34 of the rotor 1 does not coincide with the neutral axis 35 of the stator. The sensor 7 is disposed in the neutral axis 35 of the stator whereas the annular disc R is arranged so that, with a prescribed or desired direction of rotation as indicated by the arrow P, switching over (commutation) of the switching elements 4 and 5 takes place substantially at the instant at which the ends of the annular disc R pass the sensor 7, i.e. substantially after every half turn of the rotor 1. N and S designate the north and south pole of the rotor 1 or the permanent magnet 33. At the normal switch-over point, the neutral axis 34 of the rotor 1 thus assumes a position in front of the illustrated position.

To explain the function of the control circuit according to FIG. 1, it will first be assumed that the modulating circuit 14 is not provided, i.e. the modulating inputs 32 and 12 are directly connected.

When the motor is switched on, the pulse generator 25 produces a starting signal $B=0$ which lasts longer than the starting period of the motor but is relatively short and is separated from the next starting signal by a substantially longer stop signal $B=1$. On standstill, a positive pulse does not yet occur at the junction 21. This happens only upon an interruption in the stator coil current, i.e. during running. The pulse sequence frequency measuring element 22 therefore feeds an 0 signal to the comparator 23 so that a non-running signal $A=1$ occurs at the output of the comparator. Under these circumstances, as long as the starting signal $B=0$ lasts, the gating input 15 of the gate circuit 13 is, by reason of the inversion by the NOT element 27, supplied with a 1-signal which gates the gate circuit 13. This causes one of the two switching elements 4 or 5 to receive a 1-signal, depending on whether a 1- or a 0-signal is applied to the input 12. When the rotor 1 initially assumes such an angular position that the control signal $S_2$ (which is an 0-signal) occurs, a 1-signal occurs at the output of the link element 16, is fed to the control input of the switching element 5 by way of the NOT element 18 as a switching signal $Sa_2$ in the form of an 0-signal, and holds this blocked. In contrast, the link element 17 delivers an 0-signal which is fed by way of the NOT element 19 to the control input of the switching element 4 as a switching signal $\overline{S}a_2$ in the form of a 1-signal and controls same. However, if while the rotor 1 was at a standstill the control signal $S_1$ occurred, i.e. a 1-signal, then the switching element 5 is controlled first. Control of the one or other switching element 4 or 5 starts the motor so that positive pulses also occur at the junction 21 with a sequence frequency which is such that the pulse sequence frequency measuring element 22 delivers a measuring signal which is equal to or larger than the reference voltage delivered by the reference voltage source. This corresponds to the case where both inputs of the comparator 23 have a 1-signal applied to them. The comparator output therefore changes from non-running signal $A=1$ to the normal running signal $A=0$ and blocks the AND element 26 irrespective of whether $B=0$ or $B=1$. This means that a 1-signal continues to be fed to the gating input 15 which continues to gate the gate circuit 13 and allows to pass the control signals $S_1$, $S_2$ as switching signals $Sa_1$, $Sa_2$ and $\overline{S}a_1$, $\overline{S}a_2$ which, now that the motor is running, follow one another at shorter intervals. The control input of the switching elements 4 and 5 are thus alternately fed with 1-signals in the same rhythm as the control signals. Accordingly, the frequency of the pulses at the junction 21 also remains so high that the measuring signal at the output of the pulse sequence frequency measuring element 22 remains a 1-signal and the output signal A from the comparator 23 remains the normal running signal $A=0$.

However, if the motor or rotor 1 is blocked, for example through overloading, the sequence frequency of the control signals $S_1$, $S_2$ and thus that of the pulses at the junction 21 is absent, so that the non-running signal $A=1$ occurs. As a result the starting signals $B=0$ are again allowed to pass by the AND element 26 and automatically carry out a starting attempt with each starting signal until the blocking disappears, say, by itself and the motor has again run up to speed. However, the duration of the starting signals $B=0$, for example 0.28 seconds, is so short in relation to the total duration of the period of the signal B of about 22.4 seconds that the starting signals $B=0$ do not have a damaging effect on the motor in the blocked condition thereof. In the blocked condition, by reason of the repeated interruption of the current in the secondary winding 2, the stop signals $B=1$ cause positive pulses to occur at the junction 21 in such a position of the rotor that the input 12 of the gate circuit 13 has an 0-signal $S_2$ applied to it during the duration of blocking. However, these positive pulses do not have the same low frequency as the starting and stop signals B, so that the pulse sequence frequency measuring signal does not exceed the reference voltage and no normal running signal $A=0$ is delivered at the output of the comparator 23.

Since a measuring time unit must be maintained to measure the pulse sequence frequency of the positive pulses occurring at the junction 21, the time element contained in the measuring element 22 and determining the measuring time unit is so designed that the required waiting period to be maintained during normal operation to let the motor run up to speed is simultaneously ensured before the normal condition is signalled by the occurrence of the normal running signal A=0 and the starting signals B=0 are blocked.

The switching-over point of the switching elements 4 and 5 is disposed just in front of the neutral angular position in which the neutral axis of the rotor 1 coincides with the neutral axis of the stator. At the switching-over point, the ends of the disc R substantially coincide with the neutral axis 35 of the stator. This has the advantage that the pole changing of the stator field occurs in such good time that it is concluded as a result of natural retardations when the rotor has just passed through the neutral angular position. During operation of the motor, the torque exerted by the stator field will then act in the desired direction of rotation over a large angular range, in this case in the direction of the arrow P. If switching over of the switching elements were to take place exactly in the neutral angular position, a braking torque would be exerted on the rotor from then up to final pole changing of the stator field.

This choice of the position of the switching-over point can, however, present difficulties on starting if the rotor 1 stops in an angular position in which its neutral axis 34 is in a position between one coinciding with the switching-over point and one coinciding with the neutral axis 35 of the stator, as is shown in FIG. 1. In this position, on switching the motor on the first starting signal B=0 causes the stator field to be built up with a polarity that drives the rotor 1 opposite to the desired direction P until shortly thereafter the switching-over point is reached and, after same has been passed, a stator field is built up which brakes the rotor again and drives it in the opposite, i.e. in the desired direction. Since this again causes the switching-over point to be passed immediately, the pole of the stator field changes again before the neutral angular position has been passed because the angle turned from the change-over point of the rotor up to the change-over point in the desired direction P is insufficient to impart to the rotor a rotary speed large enough to overcome the counter-torque exerted by the renewed pole-changing of the rotor field up to reaching the neutral angular position. In this case the counter-torque is even increased by the permanent magnet 33. As a result, the rotor 1 constantly pendulates to and fro without running up to speed. However, these considerations apply only if, as previously mentioned, the modulating circuit 14 is not provided.

By reason of installing the modulating circuit 14, the pendulating oscillations of the rotor 1 are avoided. For the purpose of explanation, it is again assumed that the rotor 1 has stopped in the FIG. 1 position so that the 0-signal $S_2$, the non-running signal A=1 and the stop signal B=1 occur. The gating input 15 of the gate circuit 13 therefore has an 0-signal applied to it so that both switching elements 4 and 5 are necessarily supplied with an 0-signal $\bar{S}a_1$ or $Sa_2$, respectively. On the occurrence of the first starting signal B=0, however, a 1-signal is supplied to both inputs 15 and 28. As a result, the gate circuit 13 is gated and simultaneously the time element 29 is actuated so that the latter produces a 1-signal whilst the time element is running. This 1-signal is inverted by the NOT element 30 into a 0-signal and blocks the AND element 31. Since there is already an 0-signal $S_2$ at the input 32, the 0-signal is maintained at the output of the AND element 31 but the signal condition at the output of the gate circuit 13 changes by reason of the occurrence of the 1-signal at the gating input 15 so that the signals $Sa_2$ and $\bar{S}a_2$ now occur. The switching element 4 is thus controlled whereas the switching element 5 remains blocked. As shown in FIG. 1, the stator field now being built up by reason of the current flowing through the stator winding 2 is directed so that it drives the rotor out of the FIG. 1 position opposite to the desired direction of rotation P. The duration of the starting signal B=0 and the relatively shorter duration of the time element 29 are, however, chosen to be so long that the rotor 1 will still pass the switching-over point during the running time of the time element 29. Since the AND element 31 remains blocked during the running time of the time element 29, there is now no switching-over of the switching signals even though the control signal $S_1$ now occurs. As a result, the rotor 1 moves beyond the switch-over point opposite to the desired direction of rotation P until finally the running time of the time element 29 has expired. As soon as the running time of the time element 29 has expired, the gating input of the AND element 31 is supplied with a 1-signal so that it is gated and the control signal $S_1$ still occurring at its other input 39 is operated. Since the starting signal B=0 and thus the 1-signal are still at the gating input 15 of the gate circuit 13, the switching signals are now switched over to $Sa_1$ and $\bar{S}a_1$ so that the switching condition of the switching elements 4 and 5 also changes and pole changing of the stator field occurs as is shown in FIG. 4. The rotor 1 is therefore braked and then finally commences to start again in the desired direction P. Since a larger starting angle is now available for it until again reaching the switching-over point and thus the neutral angular position, it can reach such a high rotary speed that it passes beyond the switching-over point and the neutral angular position even though the opposite polarity is built up in the stator field when passing the switching-over point. The stator field can therefore still have a slight braking effect until the neutral angular position is passed but it continues to drive the rotor in the desired direction P (FIG. 5) after passing the neutral angular position. The starting signal B=0 lasts at least until the next switch-over point is reached after half a revolution in the direction P. However, the rotary speed of the rotor has in the meantime also increased to such an extent that the normal running signal generator formed by the elements 22 to 24 responds on the delivery of the normal running signal A=0 and takes over the maintenance of the 1-signal at the gating input 15 of the gate circuit 13 before the starting signal B=0 disappears. In this way one ensures that the time element 29 is not again actuated by the normal running signal A=0 or a further starting signal B=0 once the motor has correctly started.

On starting from a different angular position of the rotor 1 in which the south pole S of the rotor 1 faces the permanent magnet 33 to a greater extent (FIGS. 3 and 4) and the rotary angle until reaching the switch-over point (35) is sufficiently large, there will first (at standstill) appear the control signal $S_1$ for the correction rotation P in addition to the non-running signal A=1. (It is at this stage pointed out that the poles of the stator field represented in FIGS. 1 to 6 apply to the illustrated rest positions of the rotor 1 without modulation.) A starting signal B=0 then operates the time element 29, thereby blocks the AND element 31 and gates the gate circuit 13 at the input 15. The switching signal is thus changed from $\bar{S}a_1$ to $Sa_2$ whilst the switching signal $Sa_2$ is maintained. The current thus started in the stator winding 2 therefore builds up a stator field of which the north pole is in the left-hand pole shoe of the stator. The rotor 1 therefore (initially) again starts in a direction opposite to the desired direction of rotation P but the stator torque reverses before expiry of the running time of the time element 29 upon reaching the neutral position by reason of the unchanged stator field direction, so that, upon expiry of the running time of the time element 29, the rotor continues to turn in the desired direction because of the control signal $S_1$ which still exists. Starting out of this rest position therefore again takes place opposite to the desired direction of rotation P with a momentary small partial rotation but thereafter the motor will continue to turn in the desired direction with the help of the permanent magnet 33 without the occurrence of permanent pendulating motion during starting. Similarly, when starting from any other rest position the rotor does not pendulate or execute rotary oscillations. If, however, starting commences from an angular position according to FIGS. 2, 5 and 6, i.e. when the north pole N of the rotor is closer to the permanent magnet 33 than it is to the sensor 7 or in the middle of the right-hand stator pole shoe, the rotor 1 continues to be driven in the correct direction P without any reversal of direction.

Without the additional permanent magnet 33, the permanent magnet rotor 1 would assume one of the two neutral positions when the motor is stopped, i.e. when the stator is demagnetised, because the poles of the rotor 1 align themselves in the region of their largest inherent mass. However, the permanent magnet 33 ensures that the rotor 1 assumes either the position of FIG. 1 or that of FIG. 3. The position according to FIG. 3 is, however, often passed bacause the momentum of the stopping rotor 1 and the magnetic force have the same direction in this position so that usually the position according to FIG. 1 is assumed. In this position there would be a danger of pendulating motion without starting of the motor if there were no modulating circuit 14.

If the permanent magnet 33 is poled oppositely to the illustrated manner, the same starting behaviour can be achieved in principle in that the gating input 28 of the modulating circuit 14 is connected not to the input 15 but to the output of the NOT element 20 of the gate circuit 13, the link element 31' is in the form of an OR element, and the time element 29' has its poles changed so that it is actuated by a 0-1 jump and during its running time delivers an 0-signal as shown in FIG. 7 whereas the remaining construction of the control circuit of FIG. 1 can remain unchanged.

FIG. 8 represents a more detailed circuit diagram of part of the FIG. 1 control circuit. According to this, each switching element 4, 5 contains a transistor 37 or 38 with an anti-parallel-connected idling diode 39 or 40. The controllable oscillator 10 which is switched on and off by pulses from the magnetic field-responsive sensor 7 oscillates at a frequency of about 100 kHz in the switched-on condition. The downstream demodulator 11 produces from the enveloping curve of the oscillator oscillations, which start and stop corresponding to the rotary speed of the rotor 1, the control signals from which the switching signals for the transistors 37 and 38 are derived. For this purpose the demodulator 11 contains on the input side a coupling condenser 41, two diodes 42, 43 forming a half-wave rectifier, a smoothing circuit consisting of a resistor 44 and a condenser 45 in parallel, as well as an output resistor 46. The link elements 16 and 17 of the gate circuit 13 contain two push-pull connected transistor switching stages having the NOT element 20 in common with a transistor 47. The transistor 47 is, by way of a respective resistor, in series with a respective further transistor 48 or 49 and the output of the transistor 48 on the collector side is connected to the base of the transistor 49. If, therefore, the common transistor 47 is blocked in that an 0-signal is fed to the gating input 15, practically no current can also flow through the transistors 48 and 49, so that both transistors 48 and 49 deliver a 1-signal on the output side which is fed as a blocking 0-signal to the transistors 37 and 38 by reason of the reversal in the NOT elements 18 and 19. The NOT element 27 likewise contains a transistor 50 connected as an inverse amplifier.

The time element 29 contains a condenser 51 in the input branch as well as an ohmic resistor 52 with a shunt diode 53 which are applied to earth (0) from the output of the time element 29, so that the condenser 51 also acts as a differentiating RC element in conjunction with the resistor 52. The NOT element 30 contains a transistor 54.

If blocking of the transistor 50 because its base is supplied with a starting signal B=0 causes an 0-1 jump to occur at the gating input 28, the condenser 51 practically forms a short-circuit so that the transistor 54 is fully controlled. As soon as the current of the condenser 51 that decreases substantially by the time constants determined by the resistor 52 falls below a lower limiting value, the transistor 54 is again blocked. In the conductive condition of the transistor 54, the voltage between the base of the transistor 48 and earth (0) is so low that the transistor 48 remains conductive independently of the output voltage of the demodulator 11. The junction between the demodulator 11 and NOT element 30 at the base of the transistor 48 therefore has the function of the AND element 31. The diode 43 practically constitutes a short-circuit for a 1-0 jump at the input 28.

Figure 9:
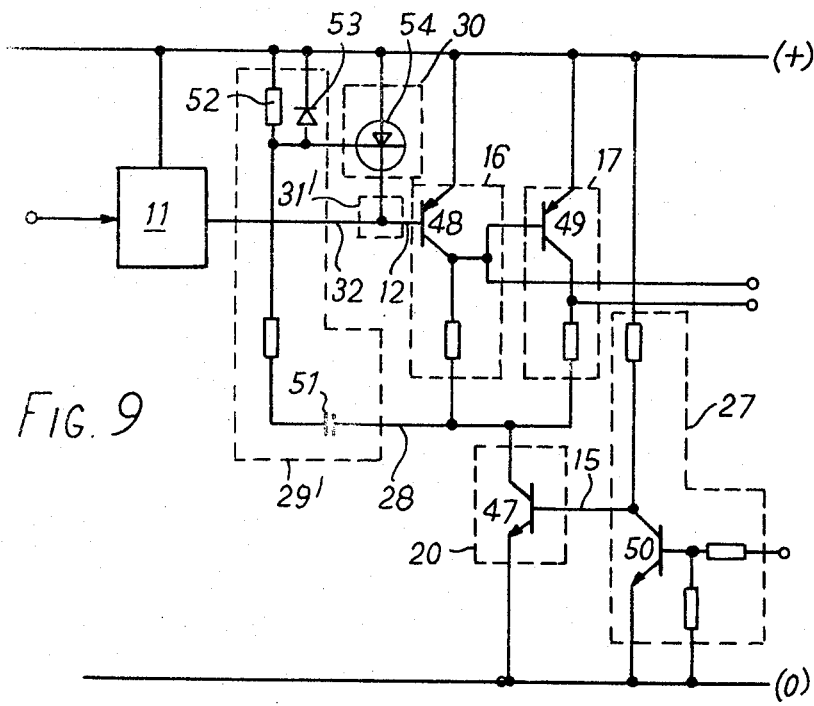
FIG. 9 is a more detailed circuit diagram of the FIG. 7 part of the control circuit.

The embodiment of FIG. 9 corresponds to that of FIG. 7. The time element 29' is connected to the collector of the transistor 47 and poled opposite to the embodiment of FIG. 8. The emitter-collector path of the transistor 54 is disposed in the base-emitter circuit of the transistor 48. By reason of the reverse poling of the time element 29', it is actuated not by an 0-1 jump but by a 1-0 jump and during its running time it delivers an 0-signal whereas the transistor 54 is controlled not by a 1-signal but by an 0-signal so that the output signal of the demodulator 11 is modulated at a starting signal B=0. This corresponds to an OR function of the link element 31'.

What is claimed is:

1. A self starting electric motor assembly comprising a permanent magnet rotor, a stator with first and second windings in parallel having DC supply and ground terminals, first and second controllable switch elements in respective series with said windings, motor operating means for producing push-pull switching signals having a switching point at a predetermined angular position before the neutral position of said rotor, means providing a static magnetic field distribution between said stator and said rotor so that said rotor assumes a resting point at a predetermined angular position before the neutral position of said rotor, means having a switching input and a gating input and first and second outputs connected respectively to said first and second switch elements, said outputs being alternately set and cleared in syncronism with push-pull switching signals applied to said switching input when said gating input is gated, starting and running means for gating said control means, modulation means between said starting and running means and said switching input including delay means actuated only by the initiation of a starting signal, said delay means being effective to block said control means input for a predetermined time during which time one of said switching elements is on and the associated stator winding effects biasing said rotor in the reverse direction a substantial angular distance in front of said switching point so that said rotor will gain a substantial starting momentum in the driving direction pursuant to the turning on of the other of said switching elements at the termination of said time.

2. An electric motor assembly according to claim 1 wherein said predetermined time is initiated from the instant of switching on said starting means, and the switching condition of said switching elements being set corresponding to the control signals in a critical extreme rest position.

3. An electric motor assembly according to claim 1 wherein the period of said delay means is less than the period of the starting signal of said starting means.

4. An electric motor assembly according to claim 1 wherein said control means includes a gate circuit for supplying said switching elements with switching signals, said gate circuit being gated in response to a normal running signal produced by said running means or at the instant of starting by a starting signal produced by said starting means, said starting signal including a comparatively short starting pulse as a gating signal and a longer pulse as blocking signal.

5. An electric motor assembly according to claim 1 wherein said modulating means includes a gate connected to said control means input which itself has inputs connected to said delay means and said motor operating means.

* * * * *